UNITED STATES PATENT OFFICE.

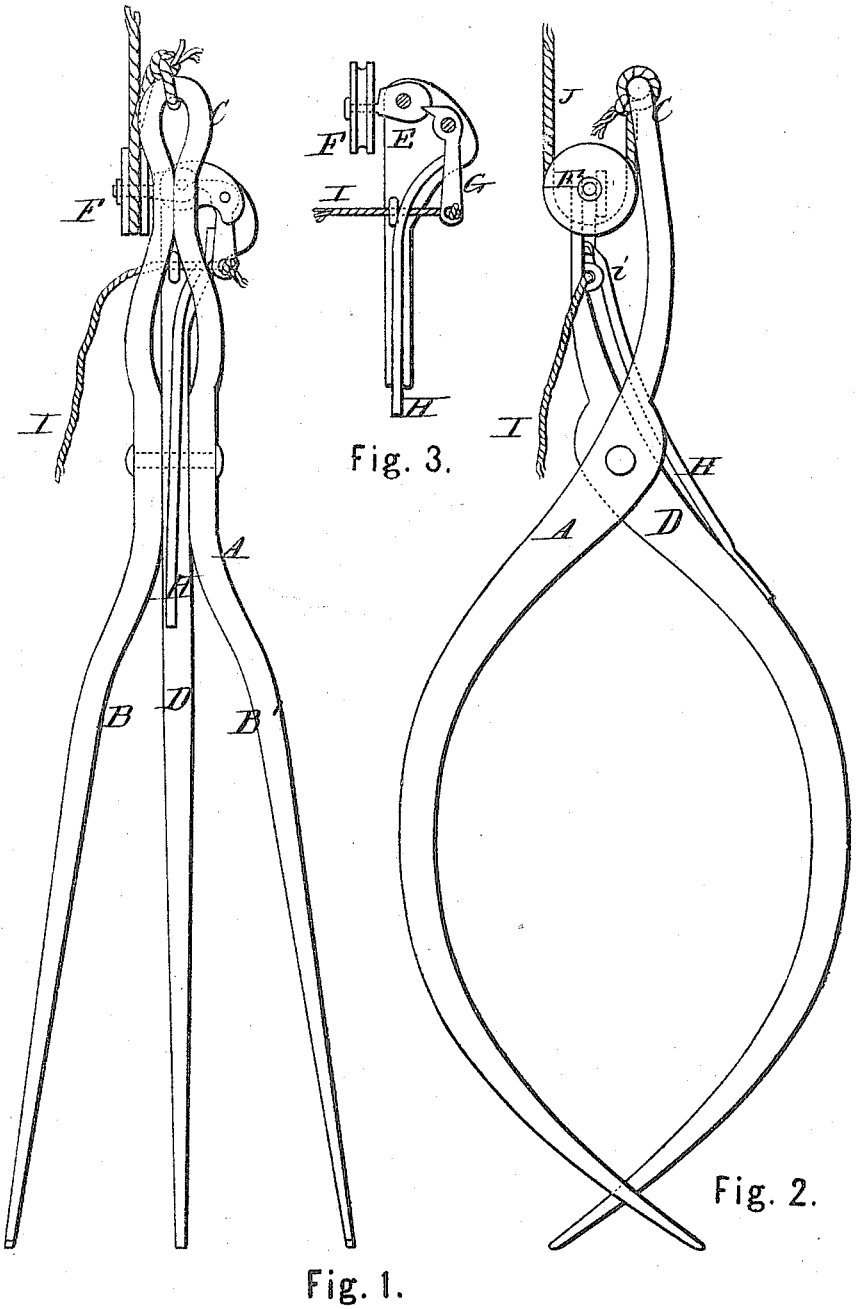

BENJAMIN FIELD, OF THREE RIVERS, MICHIGAN.

IMPROVEMENT IN HORSE HAY-FORKS.

Specification forming part of Letters Patent No. 134,265, dated December 24, 1872.

*To all whom it may concern:*

Be it known that I, BENJAMIN FIELD, of Three Rivers, in the county of St. Joseph and State of Michigan, have invented a new and valuable Improvement in Horse Hay-Fork; and I do hereby declare that the following is a full, clear, and exact description of the construction and operation of the same, reference being had to the annexed drawing making a part of this specification, and to the letters and figures of reference marked thereon.

Figure 1 of the drawing is a representation of a front view of my horse hay-fork. Fig. 2 is a side view of the same. Fig. 3 is a detail view of the trip.

This invention has relation to horse hay-forks; and it consists in the construction and novel arrangement of devices for tripping or unlocking the tines, as hereinafter described.

In the drawing, A designates a bifurcated jaw provided with two diverging tines, B B', and with an eye, C, to attach a hoisting-rope to. D represents another jaw passing through the upper part of the jaw A and pivoted thereto. The lower part of this jaw is bent to form a tine. The upper part of the jaw D is flattened out laterally, and has pivoted to it a notched plate, E, having a spindle, upon which is held a grooved pulley, F. Behind said notched plate is pivoted a dog, G, the point of which enters the notch in the edge of the plate, the dog being acted upon by a spring, H. A cord, I, is attached to the lower end of the dog, and, passing through an eye, $i$, is brought within control of the operator. The dog G serves to retain the pulley in a vertical position, its spindle projecting horizontally.

When the fork is loaded the lifting-rope J is brought underneath the pulley, and in this position holds the jaws together. To unload the fork, the cord I is pulled, releasing the dog from the plate E, and allowing the pulley to be thrown upward by the strain of the rope J. The jaws are now unlocked, and the tines may be spread apart by pulling the cord with some degree of force.

What I claim as new, and desire to secure by Letters Patent, is—

The pulley F, pivoted notched plate E, dog G, spring H, and cord I, in combination with the pivoted jaws A D and rope J, substantially as specified.

In testimony that I claim the above I have hereunto subscribed my name in the presence of two witnesses.

BENJAMIN FIELD.

Witnesses:
LUCAS THEURER,
JOHN ANABLE.